Patented May 29, 1951

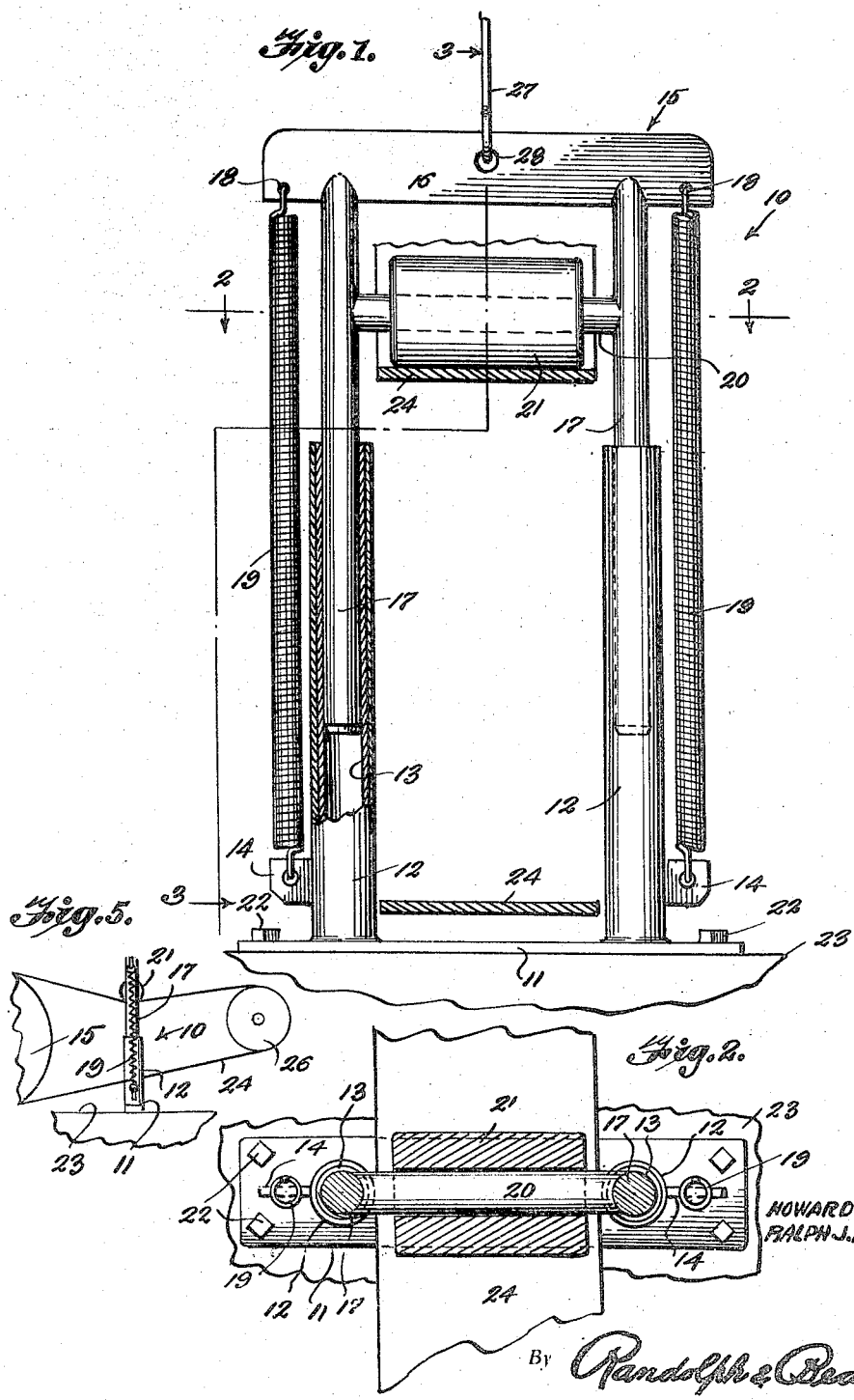

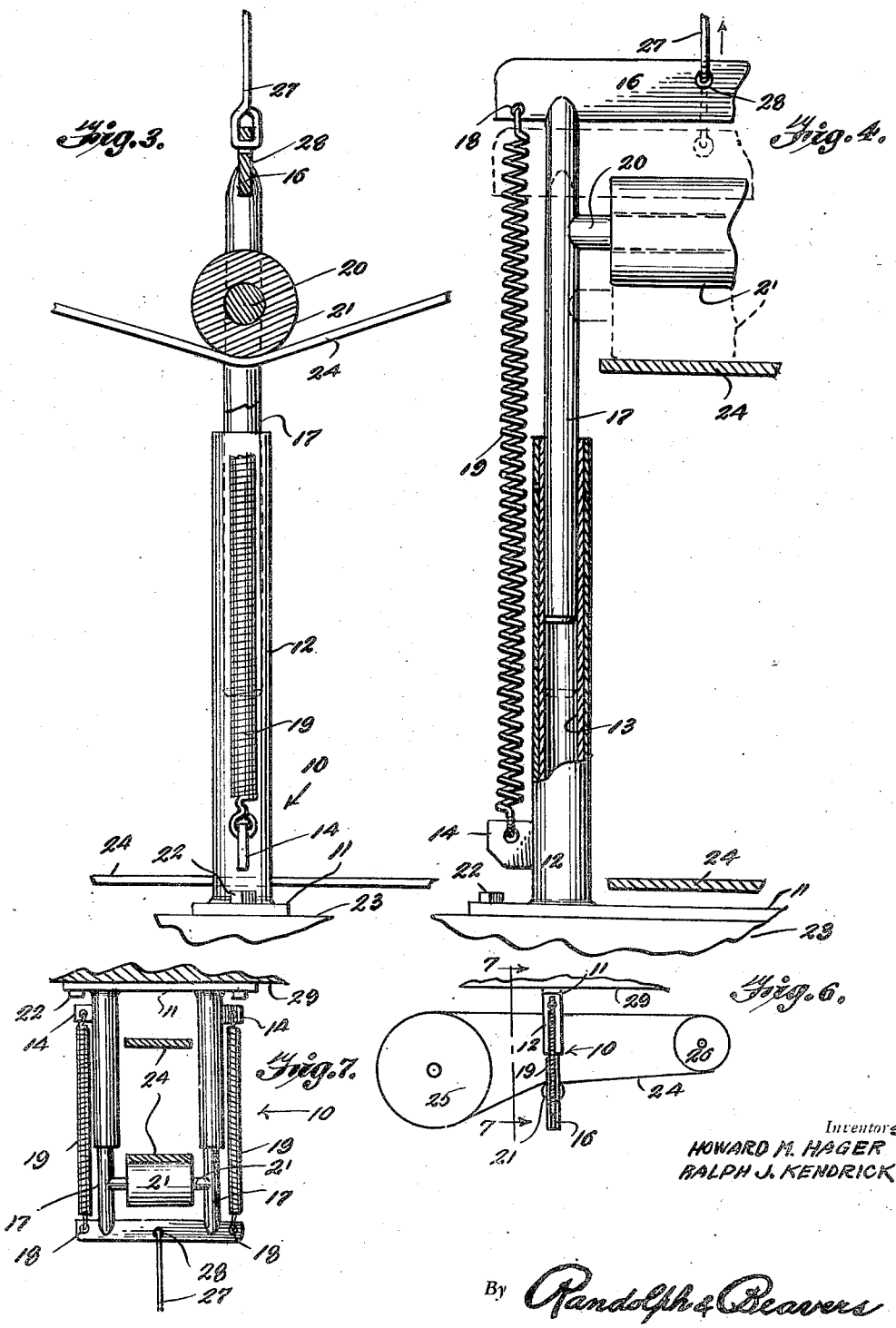

2,554,738

UNITED STATES PATENT OFFICE 2,554,738

BELT TIGHTENER AND CLUTCH

Howard M. Hager and Ralph J. Kendrick, Mansfield, Pa.

Application November 14, 1947, Serial No. 785,924

2 Claims. (Cl. 74—242.11)

This invention relates to a novel construction of combination belt tightener and clutch adapted to be interposed between two rotatable elements over which an endless belt or the like is trained for yieldably bearing upon one of the flights of the belt for maintaining a uniform tension thereon and which may be moved to an inoperative position for releasing the tension on the belt and thereby function as the clutch to interrupt rotation of one of said rotatable elements and which is driven by its connection with the belt.

Another and important object of the invention is to provide a belt tightener and clutch which may be readily installed on any suitable supporting surface above or beneath the belt in either an upright or inverted position and completely independent of the element or elements driven by the belt and the element or elements by means of which the belt is driven.

Various other objects and advantages of the invention will hereinafter become more fully apparent from the following description of the drawings, illustrating a preferred embodiment thereof, and wherein:

Figure 1 is a front elevational view, partly in vertical section of the belt tightener and clutch;

Figure 2 is a horizontal sectional view thereof taken substantially along a plane as indicated by the line 2—2 of Figure 1;

Figure 3 is a longitudinal, vertical sectional view thereof taken substantially along a plane as indicated by the line 3—3 of Figure 1;

Figure 4 is a fragmentary view similar to Figure 1 and showing the belt tightener in a released or inoperative position;

Figure 5 is a side or edge elevational view, on a reduced scale showing the belt tightener and clutch interposed between two rotatable elements connected by an endless belt and engaging the upper flight thereof;

Figure 6 is a view similar to Figure 5 but showing the belt tightener mounted in an inverted position and engaging the lower flight of the belt, and Figure 7 is a sectional view on an enlarged scale taken substantially along a plane as indicated by the line 7—7 of Figure 6.

Referring more specifically to the drawings, the belt tightener and clutch, designated generally 10 and comprising the invention includes a substantially flat base 11 having spaced parallel tubes 12 secured to and projecting from one side thereof and each of which may be provided with a liner or bushing 13. The tubes 12, adjacent the base 11 are provided with corresponding outwardly projecting apertured ears 14.

A frame, designated generally 15, includes a transversely disposed bar 16 forming a crosshead to which is secured a pair of spaced parallel rods 17 which project therefrom in the same direction and which are properly spaced to telescope into the outer, open ends of the tubes 12. The bar 16, adjacent its ends and outwardly of the rods 17 is provided with apertures 18 to each of which is anchored an end of a contractile coiled spring 19. The springs 19 are disposed outwardly of the tubes 12 and rods 17 and extend substantially parallel thereto and are connected at their opposite ends to the apertured ears 14 for urging the crosshead 16 toward the base 11 and the rods 17 inwardly of the tubes 12.

A shaft 20 extends transversely between the rods 17, adjacent the crosshead 16 to provide a journal for a roller 21. The shaft 20 may be attached to the rods 17 in any suitable manner as by soldering or welding after the roller 21 has been applied or may be demountably fastened thereto. Likewise, suitable antifriction means, not shown, may be provided between the shaft and roller.

The base 11 may be secured by suitable fastenings 22 to any suitable supporting surface 23 and so as to be disposed beneath the flights of an endless belt 24 which is trained over two rotatable elements such as the pulleys 25 and 26, one of which is driven by suitable means not shown for driving the other through the belt 24. The upper and lower flights of belt 24 extend through the belt tightener 10 between the base 11 and the roller 21 and it will be readily obvious that the springs 19 will urge the frame 15 downwardly with respect to the base 11 and tubes 12 for yieldably retaining the roller 21 in engagement with the upper flight of the belt 24 for tensioning the belt over the rotatable elements 25 and 26 and the degree of said tensioning may be varied, depending upon the size of the springs 19. By providing the belt 24 normally with sufficient slack so that it will not be driven unless tensioned, as just previously described, any suitable means may be connected to the crosshead 16 of the frame 15, as for example a release element 27 which is connected in an opening 28 of said crosshead and whereby when an upward pull is exerted thereon the frame 15 will be extended relatively to the base 11 for moving the roller 21 out of yieldable engagement with the upper flight of the belt 24 to prevent said belt from being driven by one of the rotatable elements and to thereby prevent its driving the other rotatable element. Obviously, various release means 27 could be utilized for moving the frame 15 to a released position and so that the device will function as a yieldable belt tightener and clutch between the driving and driven elements connected by the belt 24.

It will likewise be readily apparent and as illustrated in Figures 6 and 7 that the belt tightener and clutch 10 could be mounted in an inverted position and with the base 11 thereof secured to a ceiling or other overhead surface beneath and adjacent to which the belt 24 was disposed and in which case the roller 21 would engage the lower flight of said belt 24 and which is located remote to said ceiling or overhead surface 29 and it will likewise be readily apparent that the belt tightener 10 can be similarly secured to a vertical surface adjacent to which the belt 24 was disposed and with the two flights thereof located in substantially the same horizontal plane and in either of said last mentioned mountings the clutch release element 27 can be utilized in the same manner and for the same purpose.

It will also be readily apparent that the pulley 21 could be varied in size and shape for adapting it to engage belts of various cross sectional shapes, such as a conventional V-belt or for engagement with chain type belts and in each instance it will be automatically adjusted by the springs 19 to compensate for any stretching of the belt thereby eliminating unnecessary wear by materially increasing the life of the belt.

Various modifications and changes are contemplated and may obviously be resorted to, without departing from the spirit or scope of the invention as hereinafter defined by the appended claims.

We claim as our invention:

1. A structure of the class described comprising an open substantially rectangular frame formed of a stationary section and a movable section, sand stationary section including a base plate and a pair of tubes fixed to and projecting perpendicular from the base plate, said movable section including a pair of rods reciprocally engaging in said tubes having complementary ends projecting from the ends of the tubes remote to the base plate, a cross-head connecting the terminals of said complementary ends of the rods, a shaft secured to and extending transversely between the rods and disposed between the tubes and cross-head, a roller journaled on the shaft adapted to engage one flight of an endless belt both flights of which extend through the frame between the base plate and roller, and spring means connected to the frame sections and urging the movable section toward the stationary section whereby the roller is spring biased toward the base plate to tension the belt flight engaged thereby.

2. A structure as in claim 1, and a manually actuated member connected to the cross-head and extending therefrom away from the frame and operable for displacing the movable section away from the stationary section to disengage the roller from said first mentioned belt flight.

HOWARD M. HAGER.
RALPH J. KENDRICK.

REFERENCES CITED

The following references are of record in the file of this patent:

UNITED STATES PATENTS

| Number | Name | Date |
| --- | --- | --- |
| 487,564 | Hall et al. | Dec. 6, 1892 |
| 879,328 | Schinner | Feb. 18, 1908 |